United States Patent [19]

Nakao et al.

[11] Patent Number: 4,660,850
[45] Date of Patent: Apr. 28, 1987

[54] BABY STROLLER

[75] Inventors: Shinroku Nakao, Kanagawa; Hideo Saito; Yoshiyuki Suzuki, both of Tokyo, all of Japan

[73] Assignee: Combi Co., Ltd., Tokyo, Japan

[21] Appl. No.: 786,478

[22] Filed: Oct. 11, 1985

[30] Foreign Application Priority Data

Oct. 12, 1984 [JP] Japan ............................ 59-153808[U]
Feb. 22, 1985 [JP] Japan ............................ 60-24429[U]
Jun. 20, 1985 [JP] Japan ............................ 60-93385[U]

[51] Int. Cl.[4] .............................................. B62B 7/08
[52] U.S. Cl. .................................... 280/642; 280/650; 280/47.36
[58] Field of Search ........................... 297/46, DIG. 4; 280/642, 644, 647, 47.36, 650, 47.38

[56] References Cited

U.S. PATENT DOCUMENTS

| 873,283 | 12/1907 | Wolfenden et al. | 280/642 |
| 2,689,135 | 9/1954 | Toohey | 280/644 |
| 4,191,397 | 3/1980 | Kassai | 280/647 |
| 4,478,427 | 10/1984 | Hyde et al. | 280/642 |
| 4,506,907 | 3/1985 | Miyagi | 280/642 |

FOREIGN PATENT DOCUMENTS 965506 7/1964 United Kingdom ............... 280/647

Primary Examiner—John J. Love
Assistant Examiner—Michael Mar
Attorney, Agent, or Firm—Finnegan, Henderson, Farabow, Garrett and Dunner

[57] ABSTRACT

A foldable baby stroller wherein the angle of inclination of a push-handle can be selectively changed. A first rotatable hook plate is provided on a push-handle rod and is engageable and disengageable with a first lock pin, a second rotatable hook plate is provided on the push-handle rod and is engageable and disengageable with a second lock pin. A first operation lever is connected by a first wire to the first hook plate to rotate the plate and selectively engage and disengage the first lock pin. A second operation lever is connected by a second wire to the second hook plate to rotate the plate and selectively engage and disengage the second lock pin.

7 Claims, 9 Drawing Figures

BABY STROLLER

BACKGROUND OF THE INVENTION

The present invention relates to a baby stroller, particularly a baby stroller in which folding of the body thereof and the longitudinal movement and locking of a handle rod can be easily done by an operating lever provided on the handle rod.

There have been baby strollers in which the attached position of a handle rod can freely be moved to the rear or front of a stroller body so that the stroller can be pushed with a baby therein facing forward or backward, respectively. However, in these baby strollers, the operations for longitudinally changing the attached positions of the handle rod have been complicated. There has been no baby stroller in which the attached position can be changed in a one touch fashion.

OBJECTS AND SUMMARY OF THE INVENTION

An object of the present invention is a baby stroller that may be easily folded and unfolded.

Another object of the present invention is a baby stroller having a push handle that may be easily adjusted in its angle of inclination.

A further object of the present invention is a baby stroller that may be folded or release handle can be adjusted in inclination through the operation of a lever with a single hand.

These and other objects are accomplished by a foldable baby stroller comprising a back-rest frame rod, a push-handle rod; a push-handle rod provided on the backrest frame rod, a rear leg rod having a first lock pin, a first hook plate rotatably provided on the push-handle rod to be engageable with the first lock pin; a second lock pin, a second hook plate rotatably provided on the push-handle rod to be engageable with the second lock pin, an operation lever movably provided on the push-handle rod, and wire means for separately connecting the operation lever means to the first hook plate and the second hook plate to engage and disengage the second hook plate from the second lock pin in response to selected movements of the operation lever.

BRIEF DESCRIPTION OF THE DRAWINGS

The manner in which the above objects and other objects, features, and advantages of the present invention are attained will become fully apparent from the following detailed description when considered in view of the drawings, wherein.

DETAILED DESCRIPTION OF THE PREFERRED EMBODIMENTS

Figure 1:
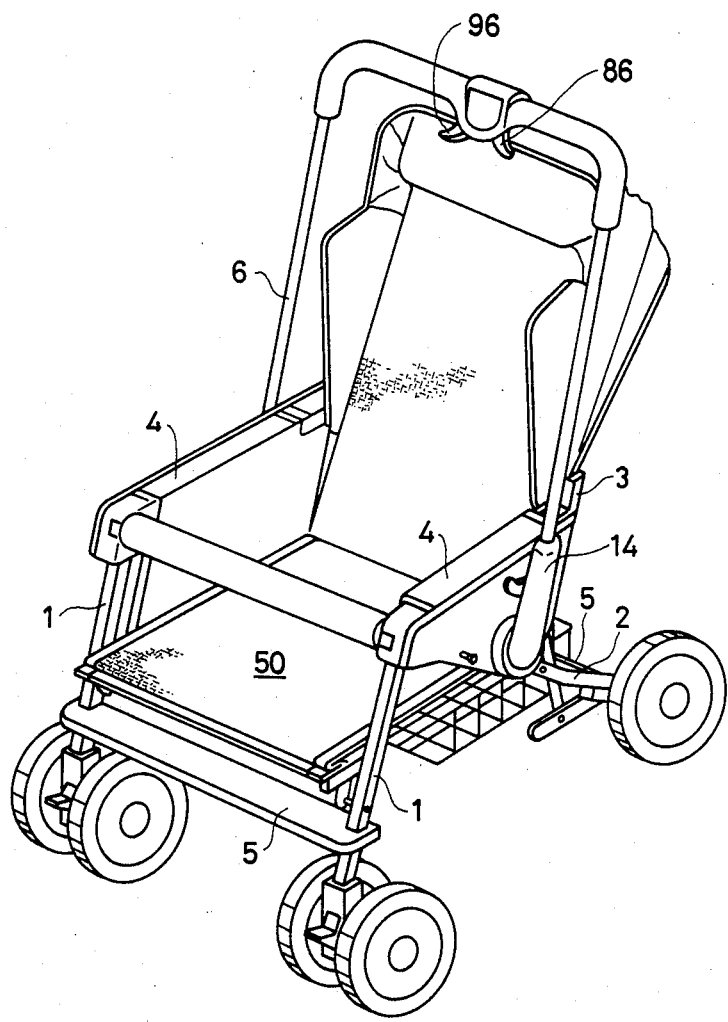
FIG. 1 is a perspective view showing a baby stroller constructed according to the present invention.

A baby stroller according to the present invention comprises in combination front leg rods 1, rear leg rods 2, back-seat rods 3, arm-rest rods 4, several transverse support rods 5 that are transversely provided between other members for constructing the body of the baby stroller, and a push-handle frame rod 6.

The uppermost parts of the front leg rod 1 and the rear leg rods 2 in the ground engaging means are respectively connected pivotably to corresponding lower parts of the tops of the arm-rest rods 4, and at intermediate positions of their height direction is provided a seat plate 50. The back-rest rod 3 is substantially U-shaped and abuts the intermediate positions of the rear leg rods 2 through an abutting frame 31 (FIG. 3) which is provided at both ends of the rod 3 so that they freely engage and disengage each other.

Slightly above the abutting position, the bottom end part of the arm-rest rod 4 is rotatably joined to the frame rod 3. The abutting frame 31 is formed substantially in a reversed T-form, and abutting is effected in such a way that both ends of the back-rest frame rod 3 are fittably inserted into perpendicular parts 31a so that a parallel rod part 31b will be parallel to the rear leg rods 2.

A push-handle rod 6 is substantially U-shaped and is sized to ensure that the back-rest frame rod 3 can be placed within a space surrounded by the push-handle rod 6. The lowermost end of the push-handle rod 6 is rotatably joined with the parallel rod part 31b of the abutting frame 31 attached to the lowermost end of the back-rest frame rod 3 through a pivot pin 80.

Figure 4:
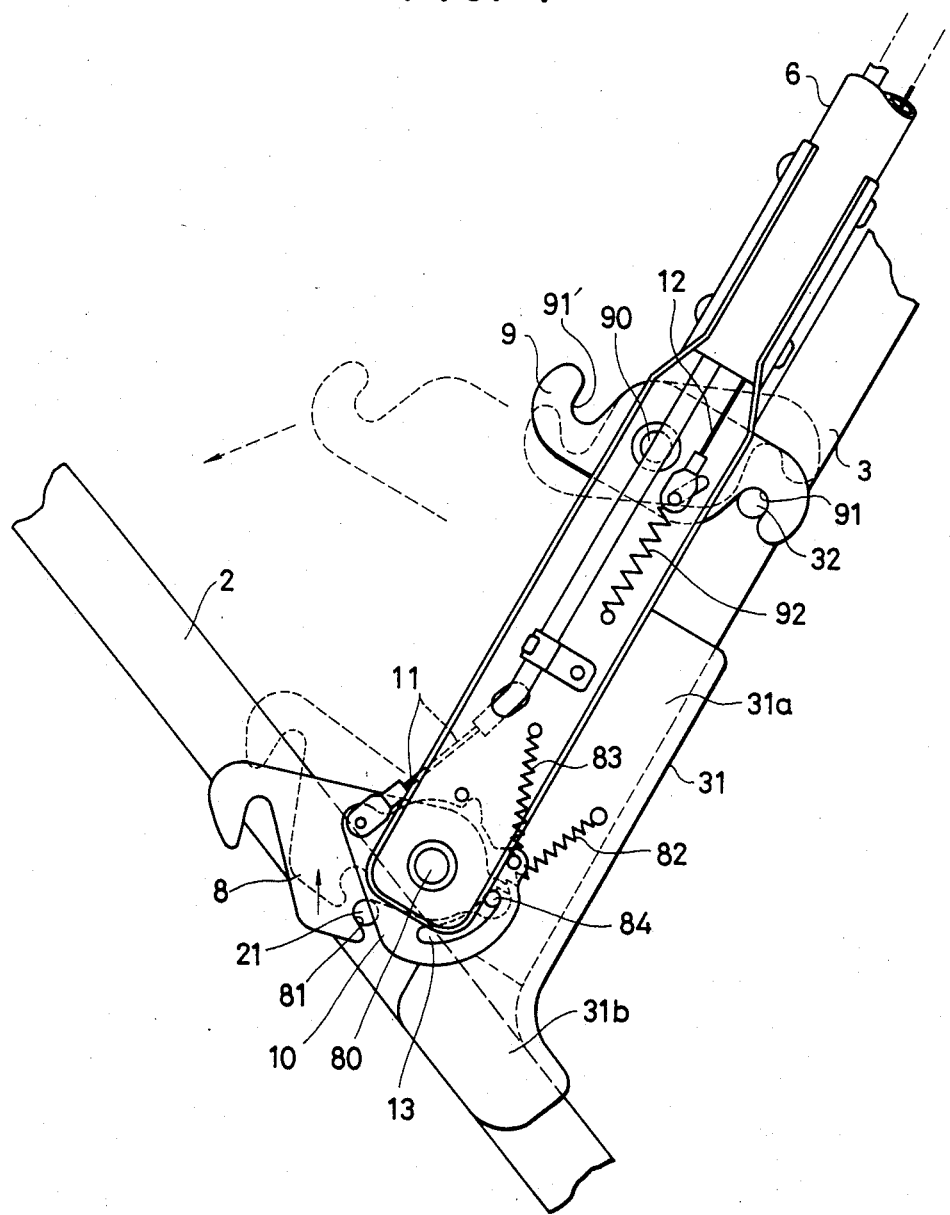
FIG. 4 is an enlarged front view showing a portion of stroller of the present invention with a cover removed.
Figure 5:
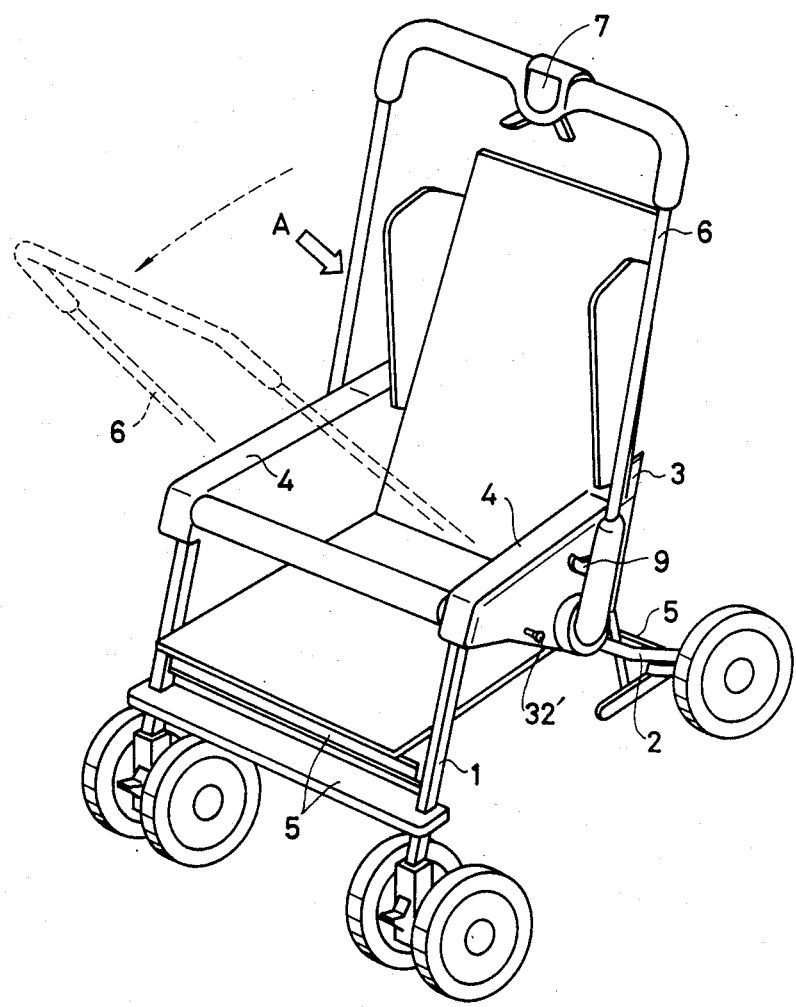
FIG. 5 is a perspective view showing the baby stroller of the present invention with the handle rod shown in FIG. 1 having been moved forward.

A hook plate 8 is attached to the lowermost part of the push-handle frame rod 6 for free rotation about a pivot pin 80 (FIG. 4). An engaging recess part 81 is formed at an end of the hook plate 8 and is freely engaged and disengaged with a lock pin 21 which protrudes from the rear leg rod 2. A lock supporting spring 82 of the hook plate 8 pulls up the hook plate 8. The spring 82 is connected at one end to an operation protrusion 84 formed at an opposite side with respect to the engaging recess 81 and at the other end to the bottom end part of the push-handle frame rod 6. The engaging recess 81 provides locking power in a downward direction to engage the lock pin 21.

A lock releasing plate 10 coupled to the hook plate 8 is rotatably joined to the back side of the hook plate 8 by means of the pivot pin 80. A slot 13 receives the operation protrusion 84 formed on the end of the hook plate 8 and works in such a manner that the operation protrusion 84 contacts the uppermost part of the slot 13 when the engaging recess 81 and the lock pin 21 are engaged. The operation protrusion 84 moves to, and contacts with, the lowermost part of the slot 13 when the engaging recess 81 and the lock pin 21 are released. A release wire 11 for the release operation of the lock releasing plate 10 is connected to the lock releasing plate 10 at a position opposite the slot 13. The lock releasing plate 10 is subjected to tension so that the release wire 11 is constantly urged in an upward direction by the force of a spring 83.

The release operation wire 11 extends through the push-handle frame rod 6 and reaches a lever 86 for releasing the holding part of the push-handle frame rod 6. It is not essential that the engagement of the push-handle frame rod 6 and the rear leg rod 2 be a combination of the hook plate 8 and the lock releasing plate 10, as shown in the drawings, and the engagement means can be freely altered to other constructions.

A cover 14 is attached to the lowermost part of the push-handle frame rod 6. Also, a fixing hook plate 9 is rotatable on a pivot pin 90 at a position slightly above the hook plate 8 at the lowermost part of the push-handle frame rod 6. On the opposite ends of the hook plate 9, engaging recesses 91, 91' are provided in such a manner that each has an opening arranged oppositely in an upward or downward direction as shown in FIG. 4.

On the intermediate position between the pivot portion of the hook plate 9 and the engaging recess 91 is attached a release operation wire 12 that is subjected to tension in a downward direction by a spring 92 to maintain engagement of the engaging recess 91 and a lock pin 32. The release operation wire 12 extends through the push-handle frame rod 6 and reaches the release operation lever 96 (FIG. 6) provided on the holding part. Thus, it is not possible for the push-handle rod 6 to change its attached position accidentally. Furthermore, it is apparent that the lock pins 32 are formed at suitable positions to ensure that the push-handle rod 6 is maintained in an anterior or posterior position.

Figure 6:
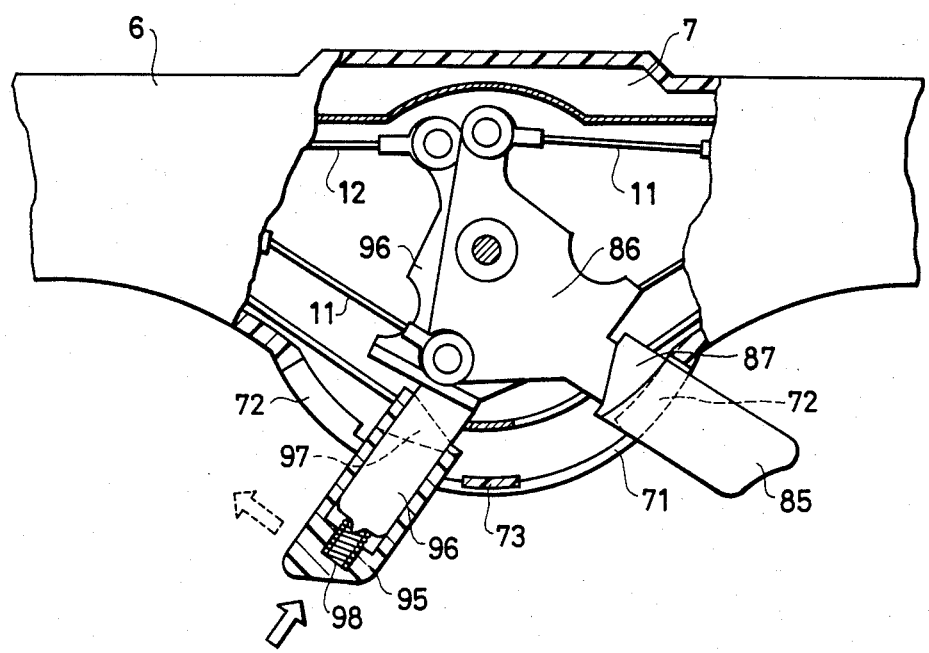
FIGS. 6 and 7 are partially cut-away plan views showing details of operation mechanisms of the handle rod according to one embodiment of the stroller of the present invention.
Figure 7:
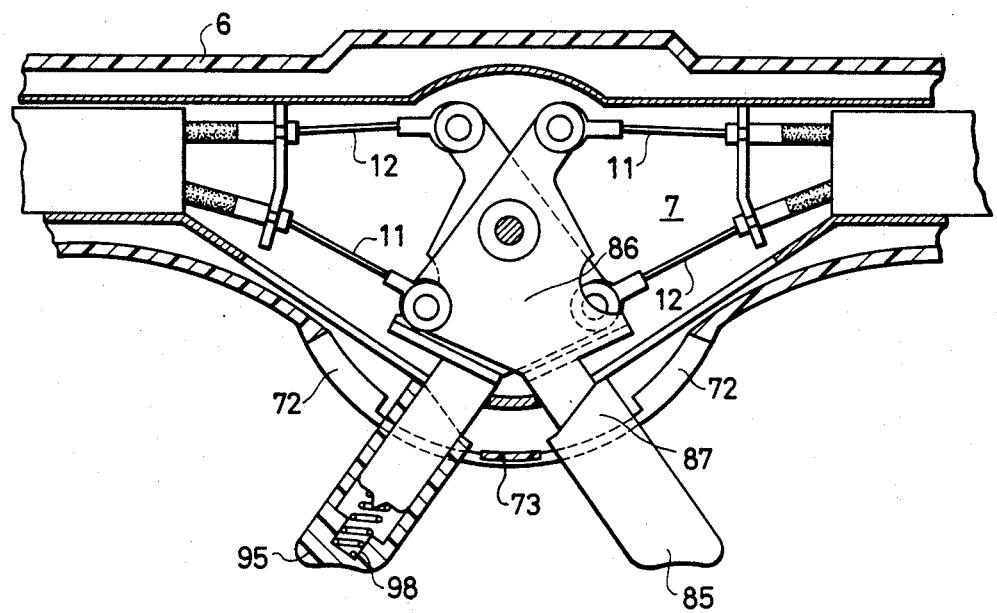

FIGS. 6 and 7 illustrate an operation part 7 provided in the center of the push-handle rod 6. From an opening 71 formed at the bottom surface of the operation part 7, an inclination operating lever 96, that operates the inclination of the push-handle rod 6 in a longitudinal direction, and a release lever 86, that releases the constructed, i.e., unfolded, state of the baby stroller body, protrude and are freely rotatable. The interior of the operation part 7 is hollow. In this hollow space, the proximal end of the operation lever 96 for operating the inclination of the push-handle rod 6 and the proximal end of the release lever 86 for releasing the constructed state of the baby stroller body are rotatable joined.

Distal ends of the operation wires 12 and 11, that extend from the proximal ends of the corresponding levers 96 and 86, respectively, are connected to a locking hook plate (not shown) attached in the proximity of the top part of the push-handle rod 6. Further, the front halves of the operation levers 96 and 86 protrude from the opening 71 formed in the bottom surface of the operation part 7. Operation tongues 95 and 85 fit over the operation levers 96 and 86, respectively. The tongues 95, 85 slide in a corresponding axial direction of the levers 96 and 86 and are subjected to tension so that they will usually protrude to the axial ends by the force of springs 98, 98'.

In the proximity of the outside proximal ends of the operation tongues 95 and 85, there are provided step portions 97 and 87 for preventing removal of the tongues. The steps 97 and 87 protrude higher than the aperture of the opening 71 in the operation part 7 and abut against the inside of the opening in the operation part 7. This prevents removal of the operation tongues 95, 85 from the operation part 7 on which the tongues 95, 85 slide to the axial end (outward) by the force of springs 98, 98'.

A thickened part 72 is formed in the opening 71 of the operation part 7. When the operation tongues 95, 85 completely protrude to the outside directions by the elastic repulsing power of the springs 98, 98' the side faces of the steps 97, 87 abut against the thickened part to ensure that the operation tongues 95 and 85 will not work irregularly. A stopper 73 is formed in the center of the opening to ensure that the two operation tongues 95 and 85 will not rotate too far in the central direction.

When it is desired to change the inclination of the push-handle rod 6, the operation tongue 95 attached on the inclination operation lever 96 at the position shown in FIG. 6 is pushed in the direction as shown by the solid line arrow in FIG. 6, that is, the operation tongue 95 is pushed in the axial direction of the operation lever 96 to release the abutment of the step 97 and the inside surface of the opening 71. In this state, the operation tongue 95 may be transversely rotated or slide in the direction of the dotted line arrow of FIG. 6. The operation lever 96 can easily and correctly be moved to a predetermined position by one touch operation and extremely smooth rotation or sliding through the opening 71 to the end thereof without the abutment of the side face of the step 97 and the thickened portion 72 formed at the ends of the opening surface.

In particular, the present invention is characterized in that the operation tongues 95 and 85 cover the operation levers 96 and 86 and are removably attached thereto by the force of the spring 98. The steps 97 and 87 are formed adjacent the proximal ends of the operation tongues 95 and 85, so that the operation tongues 95 and 85 which are subjected to tension toward the axial end direction by the springs 98 will not accidentally become detached from the operation part 7 and will not work irregularly.

Figure 3:
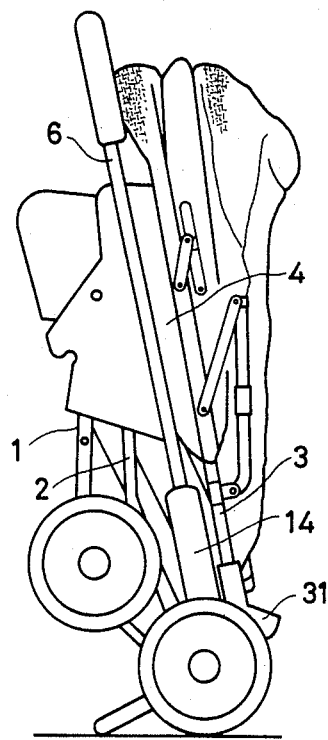
FIG. 3 is a perspective view showing the baby stroller of the present invention in a folded state.
Figure 2:
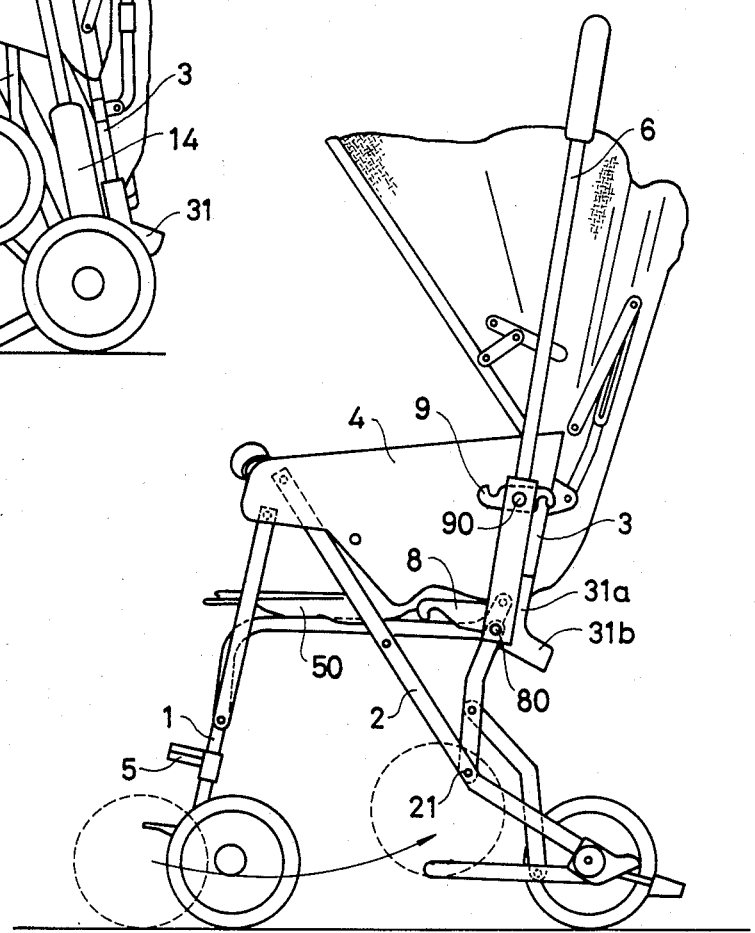
FIG. 2 is a perspective view showing the baby stroller of the present invention in the initial stages of folding wherein a lock of a handle rod and a rear leg rod has just been released.

To fold the stroller, first the release operation lever 86 provided on the push-handle rod 6 of the baby stroller body, in an unfolded state shown in FIGS. 1, 6 and 7, is pulled in the same manner as for the lever 96 shown in FIG. 6. Upon pulling up the lever 86, the distal end of the release operation wire 11 works to pull up the lock releasing plate 10. When a part of the lock releasing plate 10 is pulled up by this operation, the slot 13 formed in the opposite side to the wire attaching part is pushed down against the power of the spring 83. At the same time, the operation protrusion 84 engaged in the upper end of the slot 13 is also pushed down, so that the engagement of the lock recess 81 of the hook plate 8 and the lock pin 21 provided on the rear leg rod 2 is released to release the constructed state as shown in FIG. 4 by the dotted line. When the lock has been removed from the baby stroller, the abutment of the back-seat rod 3, the push-handle rod 6 and the rear leg rod 2 is released. Then, the rear leg rod 2 is lifted up and brought close to the front leg rod 1, so that the back-rest rod 3 and the push-handle rod 6 can also be brought close to the front leg rod 1 around the pivotal joint with the arm-rest rod 4 and the baby stroller can easily be folded away as shown in FIG. 3.

Figure 8:
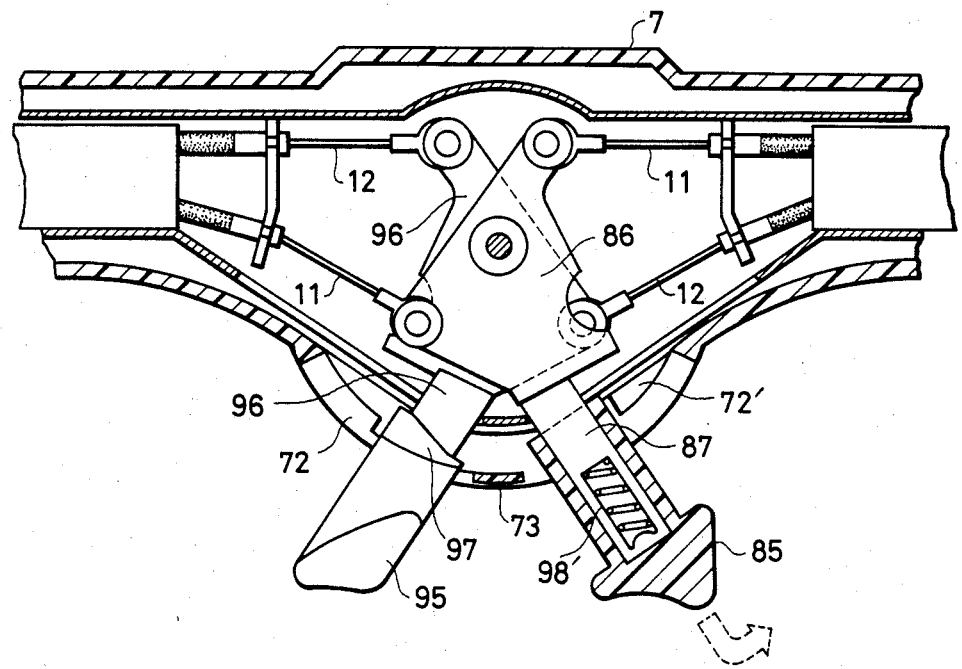
FIGS. 8 and 9 are partially cut-away plan views showing details of operation mechanisms of the handle rod according to another embodiment of the stroller of the present invention.
Figure 9:
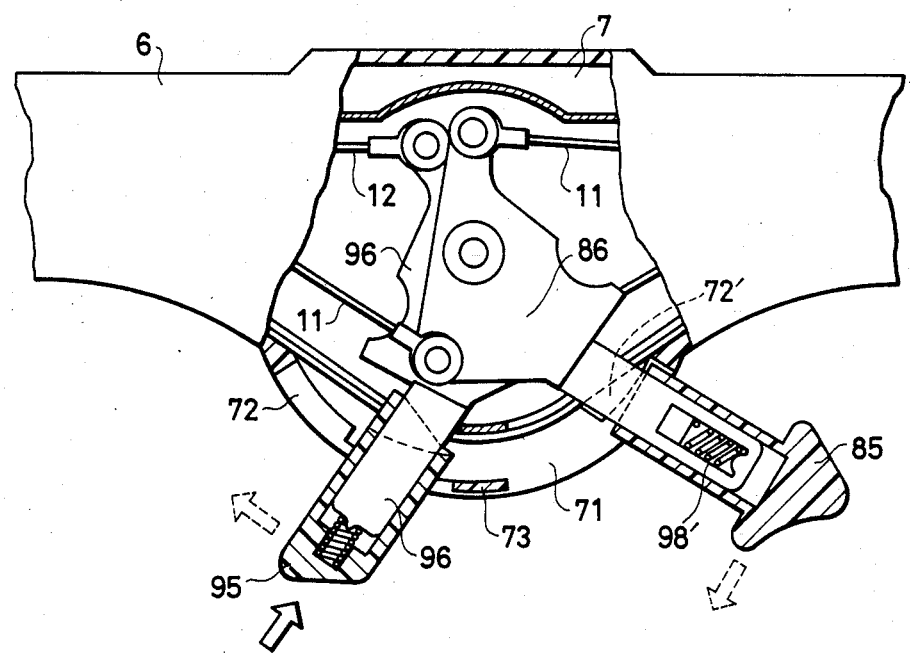

FIGS. 8 and 9 are partially cut-away plan views showing the operation part 7 of the handle rod according to another embodiment.

In the FIGS. 6 and 7 embodiment, the operation tongues 95 and 85 cover the operation levers 96 and 86, respectively, in such a manner that they can slide in the corresponding axial direction of the operation lever 96 or 86 and be subjected to tension so that they will usually protrude to the axial end by the force of a spring 98.

However, in the embodiments of FIGS. 8 and 9, one of the operation tongues 95 and 85 covering over the corresponding operation levers is arranged to slide in an axial direction of the operation lever and is subjected to tension so that it will usually be pulled down in its proximal end direction by the force of a spring 98 or 98'.

For example, as shown in FIGS. 8 and 9, the tongue 85 covering over the corresponding operation lever 86 is arranged in such a manner that it can slide in an axial direction of the operation lever 86 and be subjected to tension so as to be usually pulled down in its proximal end direction by a force of a spring 98'. In addition, its corresponding thickened part 72' is formed at a deeper position than that of the thickened part 72 formed in the opening 71 of the embodiment of FIGS. 6 and 7. In operation, first the tongue 85 is pulled up and slide so as to abut a bottom surface of the tongue 85 on a side surface of the thickened part 72' as indicated by a dotted line arrow in FIG. 8. With such movement of the tongue 85, the hook plate 8 is pulled up through the wire 11 connected to the operation lever 86 so as to disengage with the pin 21 and to release the unfolded state of the baby stroller. Further, the tongue 85 is slide as indicated by a dotted line arrow as shown in FIG. 9, so that the tongue 85 is pulled down by the force of the spring 98' and a side surface at the proximal portion of the tongue 85 abuts against another side surface of the thickened part 72' for locking.

In the above described embodiment, the tongue 85 is arranged in such a manner that it can slide in an axial direction of the operation lever 86 and be subjected to tension so as to be usually pulled down in its proximal end direction by the force of the spring 98. However, this arrangement is applicable to the tongue 95 in such a manner that it can slide in an axial direction of the operation lever 96 and be subjected to tension so as to be usually pulled down in its proximal end direction.

According to the present invention, the engagement between the hook plate 8 and the rear leg rod 2 can be released only by pulling up the release operation wire 11 by means of the release operation lever 86 provided on the push-handle rod 6 and then the folding of the baby stroller can be easily performed. The inclination of the push-handle rod against the baby stroller body can be easily changed by operating the operation lever 96. Furthermore, these operations of the baby stroller particularly need no special power and can be done with one hand.

What is claimed is:

1. A foldable baby stroller comprising:
   a seat;
   a back-rest connected to said seat;
   a substantially U-shaped push handle pivotably connected at a first pivot means to said back-rest;
   ground engaging means for supporting said seat and said back-rest, said ground engaging means including a rear leg rod having a first locking pin thereon;
   a first hook plate rotatably mounted on said push handle, said first hook plate being selectively engageable with said first locking pin for locking said rear leg rod in a predetermined position relative to said push handle when the stroller is in the operational position;
   a second locking pin on said back-rest means;
   a second hook plate rotatably mounted on said push handle, said second hook plate being selectively engageable with said second locking pin for locking said back-rest in a predetermined position relative to said push handle when the stroller is in the operational position;
   operating lever means including first and second operating levers adapted to be mounted on said push handle;
   first wire means connecting said first operating lever to said first hook plate, movement of said first operating lever selectively engaging or disengaging said first hook plate with said first locking pin; and
   second wire means connecting said second operating lever to said second hook plate, movement of said second operating lever selectively engaging or disengaging said second hook plate with said second locking pin.

2. The baby stroller of claim 1 also including a housing formed along said substantially U-shaped push handle for supporting said first and second operating levers, wherein first operating lever is connected to said first wire means for selectively disengaging said first hook plate from said first lock pin to enable the stroller to be folded, and wherein said second operating lever is connected to said second wire means for selectively disengaging said second hook plate from said second lock pin to enable said push handle to be set at a selected inclination.

3. The baby stroller of claim 2 wherein said first and second operating levers include covering means having stepped portions thereon for interacting with said housing to lock said first and second operating levers in a predetermined location.

4. The baby stroller of claim 3 wherein said covering means includes cover portions on each of said first and second operating levers and spring members biasing said cover portions axially with respect to said levers to facilitate locking of said first and second operating levers in selected locations with respect to said housing.

5. The baby stroller of claim 1, wherein said first hook plate includes a first recess for engaging said first lock pin and said second hook plate includes a second recess for engaging said second lock pin.

6. The baby stroller of claim 5, further including a first spring having a first end connected to said back-rest means and a second end connected to said first hook plate for rotating said first hook plate to engage said first recess with said first lock pin.

7. The baby stroller of claim 6, further including a second spring means having a first end connected to said back-rest means and a second end connected to said second hook plate for rotating said second hook plate to engage said second recess with said second lock pin.

* * * * *